B. J. CONDON.
AUTOMOBILE JACK.
APPLICATION FILED JUNE 1, 1915.
1,188,153.
Patented June 20, 1916.
2 SHEETS—SHEET 1.
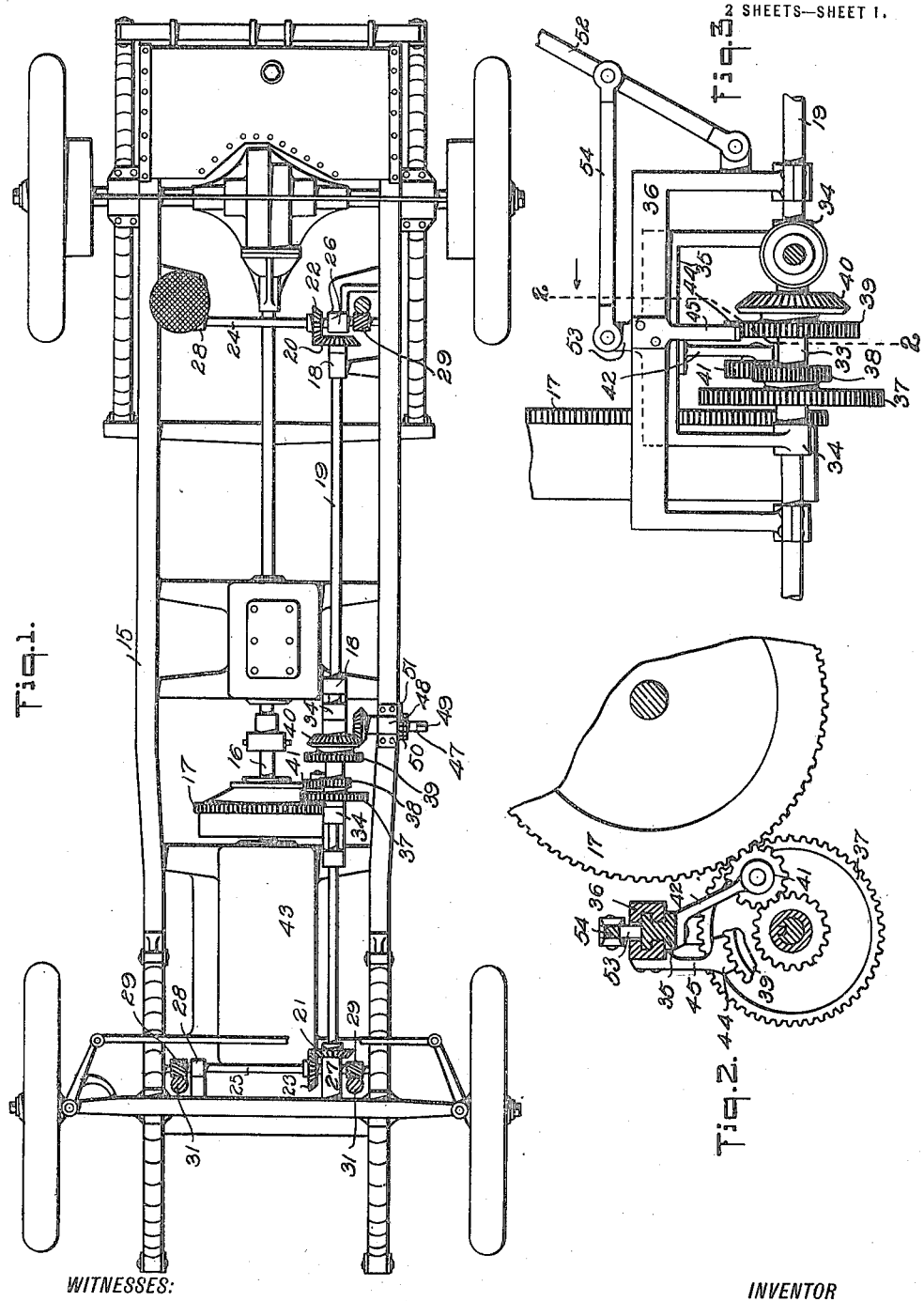
WITNESSES:
INVENTOR
Bartholomew J. Condon
BY
ATTORNEY

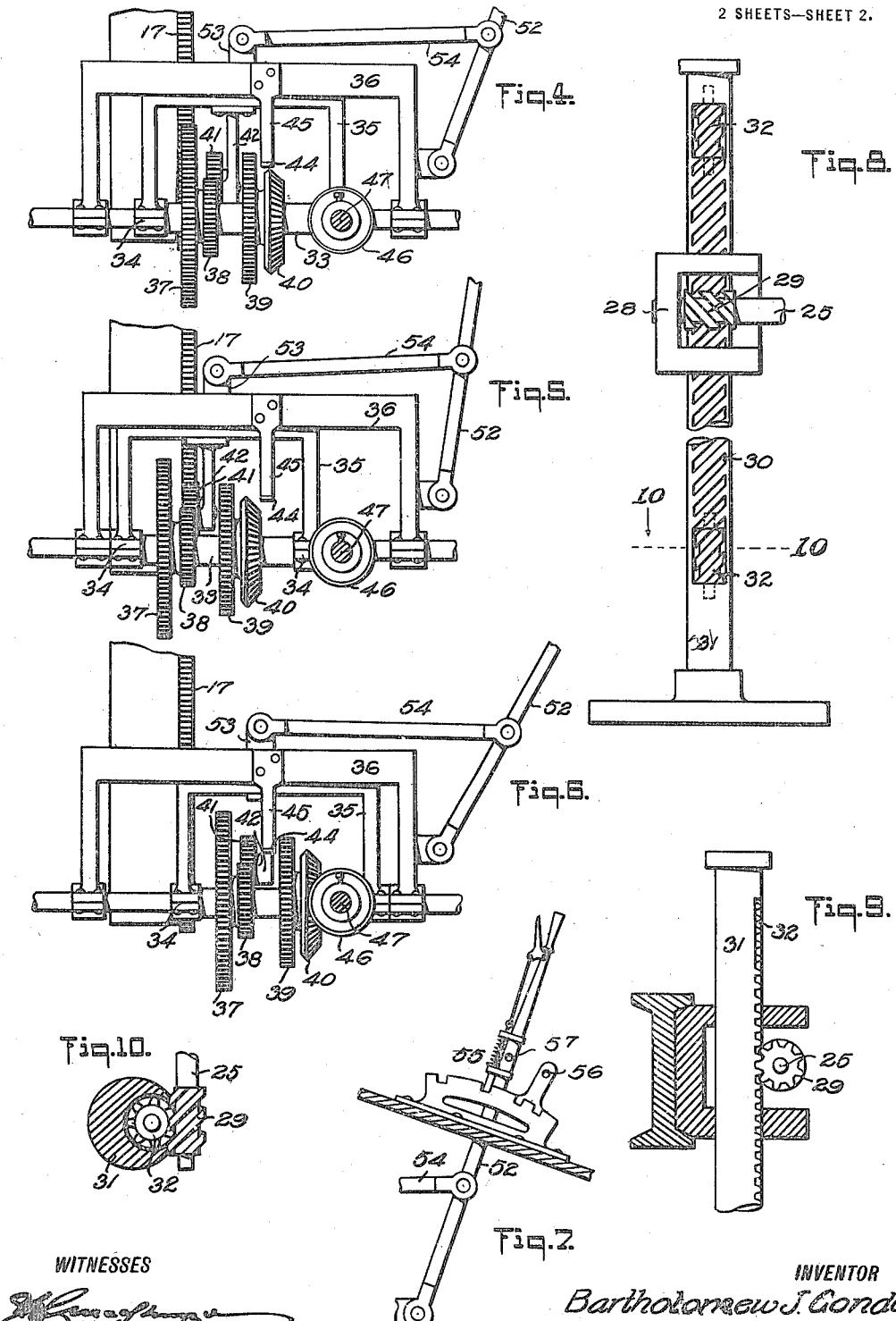

UNITED STATES PATENT OFFICE.

BARTHOLOMEW JOSEPH CONDON, OF NEW YORK, N. Y., ASSIGNOR OF ONE-HALF TO JAMES L. MacCARTHY, OF BROOKLYN, NEW YORK.

AUTOMOBILE-JACK.

1,188,153.          Specification of Letters Patent.      Patented June 20, 1916.

Application filed June 1, 1915. Serial No. 31,438.

*To all whom it may concern:*

Be it known that I, BARTHOLOMEW J. CONDON, a citizen of the United States, and a resident of the city of New York, borough of Brooklyn, in the county of Kings and State of New York, have invented a new and Improved Automobile-Jack, of which the following is a full, clear, and exact description.

My invention has for its object to provide an automobile jack which may be operated by the automobile engine or hand power to raise or lower the chassis relatively to the ground to replace tires and wheels, to make repairs and to preserve the tires when the automobile is not in use. As the operating means for the jack may be locked, it will be understood that the jack may also be employed to prevent the use of the automobile by unauthorized persons.

Additional objects of the invention will appear in the following specification in which the preferred form of my invention is disclosed.

In the drawings similar reference characters refer to similar parts in all the views in which—

Figure 1 is a plan view of an automobile chassis provided with my jack; Fig. 2 is a sectional view on the line 2—2 of Fig. 3; Fig. 3 is an enlarged fragmentary view illustrating the gearing used to operate the jack; Figs. 4, 5 and 6 are views similar to that shown in Fig. 3, but with the gear carrying sleeves moved in different positions; Fig. 7 is a sectional fragmentary view illustrating the manner of holding the guide-frame, and the sleeve in adjusted position; Fig. 8 is an enlarged view showing one of the legs of the jack with the rack teeth therearound and illustrating the worm which meshes with the rack teeth; Fig. 9 is a side sectional elevation of Fig. 8 at the worm; and Fig. 10 is a sectional view on the line 10—10 of Fig. 8.

By referring to the drawings it will be seen that the automobile chassis 15 is of the usual construction and that its shaft 16 has mounted thereon a gear 17, this gear 17, if desired, being secured to the periphery of the fly-wheel. Journaled in bearings 18 on the chassis 15 there is a longitudinally extending shaft 19 which, at one end has a beveled gear 20, a beveled gear 21 being secured at its other end, these gears 20 and 21 meshing with beveled gears 22 and 23 on the transverse shafts 24 and 25. The said transverse shafts 24 and 25 are journaled in bearings 26, 27 and 28. Secured to the transverse shafts 24 and 25 there are worms 29 which mesh with the rack teeth 30 on the jack legs 31. As will best be seen by referring to Fig. 8 of the drawings, the rack teeth 30 and the teeth of the worms 29 are disposed at substantially forty-five degrees so that the worms 29 will be held in position relatively to the jack legs 31 under the weight of the chassis, until the transverse shafts 25 are rotated. As I propose to rotate the longitudinally extending shaft 19 with the automobile motor, and as it is important that the movement of the worms 29 relatively to the jack legs 31, be limited, I provide the jack legs 31 with idle gears 32 above and below the rack teeth 30, so that when the worms 29 reach the idle gears 32, further movement of the worm 29 vertically of the jack legs 31, will be prevented.

Slidably disposed on the shaft 19 there is a sleeve 33 which is keyed to the shaft 19 so that it will rotate therewith. This sleeve 33 is journaled in bearings 34 in a guide-frame 35 which is slidably disposed in a guide 36 secured to the chassis. Secured to the sleeve 33 there is a gear 37, a gear 38, another gear 39 and a beveled gear 40, the gear 37 being adapted to mesh with the gear 17 when the guide-frame 35 and the sleeve 33 are moved to the position shown in Fig. 4 of the drawings. The gear 38 meshes with a gear 41 which is rotatably mounted on an arm 42 carried by the guide-frame 35, this gear 41 being adapted to mesh with the gear 17 when the sleeve 33 and the frame 35 are moved to the position indicated in Fig. 5 of the drawings. When the gear 37 meshes with the gear 17 and the automobile motor 43 is operated, the gear 17 through the gear 37, the sleeve 33 and the shaft 19, serves to rotate the transverse shafts 24 and 25 in one direction, while, when the gear 41 meshes with the gear 17 and the motor 43 is operated, the transverse shafts 35 are rotated in an opposite direction. By this manipulation of the guide-frame 35 and the sleeve 33, the jack legs 31 being moved downwardly relatively to the chassis or upwardly as desired. When the jack legs 31 are positioned as desired relatively to the chassis, the guide-frame 35 and the sleeve 33 may be moved to the position indicated in Fig. 3 of the drawings when the gear 39 will be in mesh with the teeth 44 on an arm 45 secured to the guideway 36. This serves as a brake and prevents the rotation of the sleeve 33 and the shaft 19 relatively to the chassis.

When it is desired to rotate the shaft 19 by hand, the sleeve 33 and the guide-frame 35 may be moved to the position shown in Fig. 6 of the drawings when the beveled gear 40 will be in mesh with the beveled gear 46, which is secured to a transversely disposed shaft 47 journaled in a bearing 48 on the chassis. The outer end 49 of this shaft 47 is angular so that a crank may be connected therewith and the shaft 47 may be rotated manually. There are ratchet teeth 50 on the shaft 47 which are engaged by a pawl 51 for holding the shaft 47 against rotation when desired.

The guide frame 35 is moved to several positions indicated by means of a lever 52 which is connected with a lug 53 on the guide-frame by a link 54. The usual means 55 are provided for holding the lever 52 in adjusted positions.

By the insertion of a member of the lock through the orifices 56 and 57 of the means 55 the jack may be locked.

Having thus described my invention I claim as new and desire to secure by Letters Patent:

1. In combination with an automobile having a shaft, a gear on the shaft, a shaft journaled in bearings in the automobile, a plurality of jack legs provided with rack teeth, worms meshing with the rack teeth for operating the jack legs, idlers rotatably mounted on the jack legs and provided with teeth for receiving the teeth of the worms at the ends of the jack legs, means operable by the second mentioned shaft for rotating the worms, a sleeve keyed to and slidable longitudinally on the second mentioned shaft, a gear on the sleeve for meshing with the first gear and means for rotating the first mentioned shaft.

2. In an automobile jack, a jack leg having rack teeth, a bracket, a worm meshing with the rack teeth and journaled in a bearing in the bracket, and an idler rotatably mounted on the jack leg and provided with teeth for receiving the teeth of the worm when the bracket moves to a pre-determined position relatively to the jack leg.

3. In combination with an automobile having a shaft, a gear on the shaft, a shaft journaled in bearings on the automobile, a plurality of jack legs, means operable by the second mentioned shaft for moving the jack legs relatively to the automobile, a sleeve keyed to and slidable longitudinally of the second mentioned shaft, a gear on the sleeve for meshing with the first gear, means for rotating the first mentioned shaft, a brake arm secured relatively to the automobile, and means on the sleeve for engagement by the brake arm for locking the second mentioned shaft when the sleeve has been moved to free the second gear from the first gear.

4. In combination with an automobile having a shaft, a gear mounted thereon, a shaft journaled in bearings on the automobile, a plurality of jack legs, means operable by the second shaft for moving the jack legs relatively to the automobile, a sleeve keyed to the second shaft and slidable longitudinally thereof, a gear on the sleeve for meshing with the first gear, another gear on the sleeve, an arm movable with the sleeve, a gear rotatably mounted on the arm meshing with the third gear, and positioned for meshing with the first gear when the sleeve is moved to a pre-determined position relatively to the first gear.

5. In combination with an automobile having a shaft, a gear mounted thereon, a shaft journaled in bearings on the automobile, a plurality of jack legs, means operable by the second shaft for moving the jack legs relatively to the automobile, a sleeve keyed to the second shaft and slidable longitudinally thereof, a gear on the sleeve for meshing with the first gear, another gear on the sleeve, an arm movable with the sleeve, a gear rotatably mounted on the arm meshing with the third gear, and positioned for meshing with the first gear when the sleeve is moved to a pre-determined position relatively to the first gear, a brake arm secured relatively to the automobile, and means on the sleeve for engagement by the brake arm for locking the second mentioned shaft against rotation.

6. In combination with an automobile jack, having a motor shaft, a gear mounted thereon, a shaft journaled in bearings on the automobile, a plurality of jack legs, means operable by the second shaft for moving the jack legs relatively to the automobile, a sleeve keyed to the second shaft and slidable longitudinally thereof, a gear on the sleeve for meshing with the first gear, another gear on the sleeve, an arm movable with the sleeve, a gear rotatably mounted on the arm, meshing with the third gear and positioned for meshing with the first gear when the sleeve is moved to a pre-determined position relatively to the first shaft, a third shaft rotatable by a crank, and a gear on the third shaft, and another gear on the sleeve positioned for meshing with the gear on the third shaft when the sleeve is moved to another pre-determined position relatively to the second mentioned shaft.

7. In combination with an automobile having a shaft, a gear on the shaft, a shaft journaled in bearings on the automobile, a plurality of jack legs, means operable by the second mentioned shaft for moving the jack legs relatively to the automobile, a sleeve keyed to and slidable longitudinally of the second mentioned shaft, a gear on the sleeve for meshing with the first gear, means for rotating the first mentioned shaft, a brake arm with teeth secured relatively to the automobile, and teeth on the sleeve for meshing with the teeth on the brake arm when the sleeve is moved to a pre-determined position relatively to the second mentioned shaft.

8. In combination with an automobile having a motor driven shaft, a gear on the shaft, a shaft journaled in a bearing on the automobile, a plurality of jack legs, means operable by the second mentioned shaft for moving the jack legs relatively to the automobile, a sleeve keyed to the second mentioned shaft and slidable longitudinally thereof, three gears on the sleeve, a gear movable with the sleeve and meshing with one of the gears on the sleeve, a third shaft, means for rotating the third shaft, a gear on the third shaft for meshing with another gear on the sleeve when the sleeve is moved to a predetermined position on the second mentioned shaft, the fifth mentioned gear meshing with the first gear when the sleeve is moved to another pre-determined position relatively to the second mentioned shaft, the remaining gear on the sleeve meshing with the first gear when the sleeve is moved to a third pre-determined position relatively to the second mentioned shaft.

9. In combination with an automobile, having a motor driven shaft, a gear on the shaft, a shaft journaled in a bearing on the automobile, a plurality of jack legs, means operable by the second mentioned shaft for moving the jack legs relatively to the automobile, a sleeve keyed to the second mentioned shaft and slidable longitudinally thereof, three gears on the sleeve, a gear movable with the sleeve and meshing with one of the gears on the sleeve, a third shaft, means for rotating the third shaft, a gear on the third shaft for meshing with another gear on the sleeve when the sleeve is moved to a pre-determined position on the second mentioned shaft, the fifth mentioned gear meshing with the first gear when the sleeve is moved to another pre-determined position relatively to the second mentioned shaft, the remaining gear on the sleeve meshing with the first gear when the sleeve is moved to a third-pre-determined position relatively to the second mentioned shaft, another gear on the sleeve, an arm secured relatively to the automobile, and provided with teeth for meshing with the last mentioned gear on the sleeve when the sleeve is moved to a fourth pre-determined position relatively to the second shaft.

10. In combination with an automobile having a shaft, a gear thereon, a shaft journaled in bearings on the automobile, a plurality of jack legs, means operable by the second mentioned shaft for moving the jack legs relatively to the automobile, a guideway on the automobile, a frame slidable in the guideway, a sleeve slidably keyed to the second mentioned shaft and secured to the frame, and a gear on the sleeve for meshing with the first gear, when the sleeve is in a pre-determined position relatively to the second mentioned shaft.

11. In combination with an automobile having a shaft, a gear thereon, a shaft journaled in bearings on the automobile, a plurality of jack legs, means operable by the second mentioned shaft for moving the jack legs relatively to the automobile, a guideway on the automobile, a frame slidable in the guideway, a sleeve slidably keyed to the second mentioned shaft and secured to the frame, a gear on the sleeve for meshing with the first gear, when the sleeve is in a pre-determined position relatively to the second mentioned shaft, an arm on the frame, a gear rotatably mounted on the arm for meshing with the first gear when the frame is in a pre-determined position relatively to the second mentioned shaft, and another gear on the sleeve for meshing with the gear on the arm.

12. In combination with an automobile having a shaft, a gear thereon, a shaft journaled in bearings on the automobile, a plurality of jack legs, means operable by the second mentioned shaft for moving the jack legs relatively to the automobile, a guideway on the automobile, a frame slidable in the guideway, a sleeve slidably keyed to the second mentioned shaft and secured to the frame, a gear on the sleeve for meshing with the first gear, when the sleeve is in a pre-determined position relatively to the second mentioned shaft, an arm secured to the frame and provided with teeth, and another gear on the sleeve for meshing with the gear on the arm when the frame is in another pre-determined position relatively to the second mentioned shaft.

In testimony whereof I have signed my name to this specification in the presence of the two subscribing witnesses.

BARTHOLOMEW JOSEPH CONDON.

Witnesses:
  CHARLES HERTER.
  JACOB HERTER.